United States Patent
Demangone

(10) Patent No.: US 6,425,691 B1
(45) Date of Patent: Jul. 30, 2002

(54) FLEXIBLE CIRCUITS WITH STRAIN RELIEF

(75) Inventor: Drew A. Demangone, Latrobe, PA (US)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/608,589

(22) Filed: Jun. 30, 2000

(51) Int. Cl.[7] .................................................. G02B 6/36
(52) U.S. Cl. ........................ 385/53; 385/136; 385/114; 439/451
(58) Field of Search .......................... 385/53, 136, 135, 385/114, 88, 89; 439/67

(56) References Cited

U.S. PATENT DOCUMENTS

| | | | |
|---|---|---|---|
| 4,496,215 A | 1/1985 | Shaheen et al. | 350/96.23 |
| 4,850,883 A * | 7/1989 | Kabadi | 439/67 |
| 4,913,656 A * | 4/1990 | Gordon et al. | 439/67 |
| 5,204,925 A | 4/1993 | Bonanni et al. | 385/89 |
| 5,259,051 A | 11/1993 | Burack et al. | 385/76 |
| 5,348,488 A * | 9/1994 | Green et al. | 439/140 |
| 5,828,805 A | 10/1998 | Morlion et al. | 385/59 |
| 6,005,991 A | 12/1999 | Knasel | 385/14 |

* cited by examiner

Primary Examiner—Brian Sircus
Assistant Examiner—Brian S. Webb
(74) Attorney, Agent, or Firm—Perman & Green, LLP

(57) ABSTRACT

A printed circuit board assembly includes a flexible circuit having a strain relief feature included on the flexible circuit. The board assembly includes a printed circuit board; connector adapted to be secured to the board; and a length of a flexible circuit having a number of conductors therein, one end portion of the length including a tab element, the end portion of which is secured to the connector and includes at least one strain relief member, each member adapted to be secured to the connector.

26 Claims, 2 Drawing Sheets

FLEXIBLE CIRCUITS WITH STRAIN RELIEF

BACKGROUND OF THE INVENTION

1. Field of the Invention

The present invention relates generally to flexible circuits and methods for manufacturing such circuits, and more particularly to printed circuit board assemblies including optical fiber connectors and a flexible optical circuit. Even more specifically the present invention relates to the use of flexible optical circuits with strain relief arms. These arms assist in both mounting the flexible circuit to a circuit board or optical connector, and also in absorbing any forces acting on the flexible circuit thereby preventing damage to the optical fibers.

2. Brief Description of Earlier Developments

Many present day telecommunications systems, computer systems, etc. transmit and/or process both electrical signals and optical signals. Typically, optical signals are routed via optical fibers over relatively long distances in order to increase the transmission speed and efficiency relative to the propagation of electrical signals. In contrast, much of the signal processing analysis and storage is performed electrically. Thus, these systems must frequently convert optical signals to electrical signals, and electrical signals to optical signals.

Many of these systems, include a number of printed circuit boards or cards which plug into a back plane or mother board. The back plane generally provides power as well as a reference voltage or ground to each of the printed circuit boards. In addition, the back plane provides a pathway by which the printed circuit boards communicate with each other.

These types of circuit assemblies include optical connectors and flexible optical circuits which are secured optically via optical fibers to the optical connectors. Quite often either an optical disconnect and resulting data loss occurs in the system or even total failure of the optical system occurs due to a sudden strain type force (i.e. something that snags or pulls on the flexible circuit). It is a primary and specific advantage of the present invention to define a flexible optical circuit, method of manufacturing such a circuit and printed circuit assembly employing the flexible optical circuit, which includes a strain relief feature to avoid this type of optical disconnect issue.

Examples of some references which describe technology in the similar technical areas of this application include U.S. Pat. No. 4,496,215 (a flexible fiber optic cable for connecting an optical transmitter to an optical sensor in an electronic assembly), U.S. Pat. No. 5,204,925 (a flexible optical circuit having tab portions where the optical fibers terminate), U.S. Pat. No. 5,259,051 (apparatus and method of making optical fibers) and U.S. Pat. No. 6,005,991 (printed circuit board assembly having a flexible optical circuit).

SUMMARY OF THE INVENTION

In accordance with one embodiment of the present invention a printed circuit board assembly is provided comprising: a printed circuit board; an optical fiber connector adapted to be secured to the board; and a length of a flexible optical circuit having a number of optical fibers therein, one end of the length of flexible circuit includes a tab element the end portion of which is secured to the connector, the end portion also including at least one flexible strain relief arm projecting therefrom, each arm adapted to be secured to the connector.

In accordance with another embodiment of the present invention a flexible optical circuit comprises: at least one optical connector; and a length of a flexible material having a number of optical fibers therein, one end portion of the length of flexible material including a tab element the end portion of which is secured to the connector, the end portion also including at least one flexible strain relief arm projecting therefrom, each arm adapted to be secured to the connector.

In accordance with another embodiment of the present invention a method of fabricating a flexible optical circuit comprises the steps of: providing a plurality of optical fibers extending between first and second end portions of a length of flexible material, the length of flexible material having at one end portion a flexible tab element in combination with at least one flexible strain relief arm; mounting an optical connector to the flexible tab, the connector adapted to be secured to the relief arm; and securing each of the relief arms to the connector.

In accordance with another embodiment of the present invention a flexible circuit, comprises: a flexible substrate having an edge; at least one conductive element extending through the flexible substrate and having an end at the edge of the flexible substrate to engage a connector; and at least one strain relief element adjacent the end of the conductive element to engage the connector or a substrate on which the connector is mounted; wherein the strain relief prevents dislocation of the conductive element from the connector.

In accordance with still another embodiment of the present invention a method of preventing dislocation of a flexible circuit from a connector, the flexible circuit having an area occupied by conductive elements and an area unoccupied by the conductive elements, the method comprises the steps of securing the occupied area of the flexible circuit to the connector; and securing the unoccupied area of the flexible circuit to the connector or to a substrate on which the connector mounts; wherein the unoccupied area of said flexible circuit prevents a strain acting on the flexible circuit from reaching the occupied area and from disclocating the flexible circuit from the connector.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
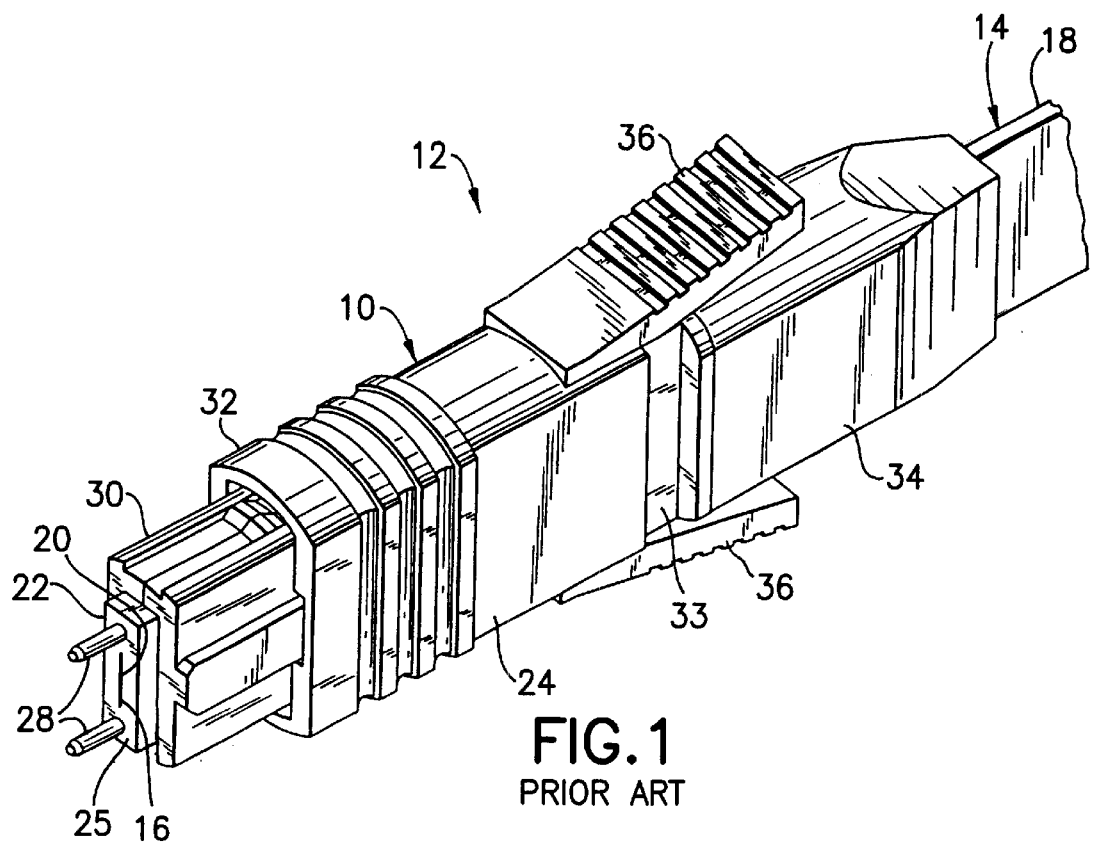
FIG. 1 is a perspective view of a portion of a conventional optical cable assembly.

Although the present invention will be described with reference to the embodiments shown in the drawings, it should be understood that the present invention can be embodied in many alternate forms of embodiments. In addition, any suitable equivalent size, shape or type of elements or materials could be used.

Referring to FIG. 1, there is shown a perspective view of a conventional optical fiber connector 10. The connector 10 can be part of a cable assembly 12 which may utilize an optical fiber ribbon cable 14. The cable assembly 12 could include additional components. The cable 14 generally comprises optical fibers 16 (typically having a core and cladding material), a buffer material (not shown), strengthening material (not shown), and a jacket or cover 18. The cover 18 is removed at the end 20 of the fibers 16 passing through the ferrule 26. Any suitable optical fiber cable could be provided. In this embodiment the end 20 of the fibers 16 are aligned in a row for engaging a mating optical connector.

The connector 10 generally comprises a subassembly 22 and a connector housing 24. The subassembly 22 generally comprises the end 20 of the fibers 16, a ferrule housing 25, a locator 27 (see FIG. 2), and guide pins 28. The connector housing 24 generally comprises a coupling body 30, a coupling sleeve 32, a carrier sleeve 33, and an end sleeve 34. A similar connector housing is described in U.S. Pat. No. 5,828,805 which is hereby incorporated by reference in its entirety. However, in alternate embodiments any suitable type of connector housing could be provided. The subassembly 22 is fixedly connected to the coupling body 30. The coupling body 30 is fixedly connected to the coupling sleeve 32. The coupling sleeve 32 is movably mounted on the carrier sleeve 33 and biased by a spring (not shown) in a forward direction. The coupling sleeve 32 includes lips 36. The end sleeve 34 is connected to the carrier sleeve 33 and surrounds a portion of the cable 14.

Figure 2:
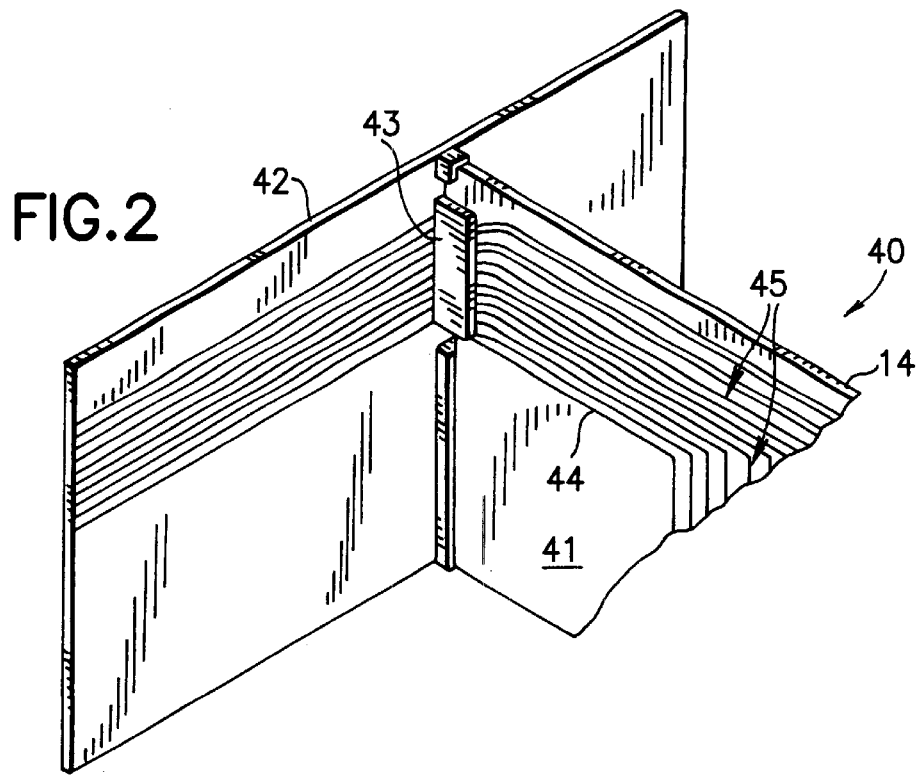
FIG. 2 is a partial perspective view of a printed circuit board assembly that is plugged into a back plane.

Referring now to FIG. 2 a printed circuit board assembly 40 according to an embodiment of the present invention is illustrated. The printed circuit board assembly includes a printed circuit board 41 that is illustratively plugged into a back plane or motherboard 42. The printed circuit board generally includes a number of electrical contacts or connections for making electrical contact with the corresponding connectors 43 on the back plane. The printed circuit board assembly also has a connector for establishing optical communication with one or more optical fibers routed along the back plane. The printed circuit board assembly 40 includes a flexible optical circuit 44 disposed upon the printed circuit board 41. The flexible optical circuit includes a flexible sheet of conductive material in which is embedded a plurality of optical fibers 45. The flexible optical circuit can, for example, include a pair of flexible sheets of conductive material with the optical fibers being sandwiched therebetween. The flexible sheets can be formed of many different conductive materials such as for example MYLAR or KAPTAN. The thickness of the flexible sheets can vary so as to modify the degree of flexibility of the flexible optical circuit. The flexibility of the flexible optical circuit varies inversely with respect to the thickness of the flexible sheets. Flexible circuits formed of MYLAR sheets having a thickness of about 6 mils has been found to be very suitable.

As stated, the flexible optical circuit 44 includes a number of optical fibers 45 embedded in the flexible material. For example, the optical fibers 45 can be secured between flexible sheets by means of an adhesive such as a pressure sensitive adhesive. The flexible optical circuit 44 is typically mounted to the printed circuit board 41 in a variety of ways. Example of various known methods that the flexible optical circuit can be mounted to the printed circuit board include by means of hold down clips, mechanical standoffs or adhesive. Alternatively, the flexible optical circuit can be positioned within a rigid structure that is, in turn, mounted to the printed circuit board. The flexible optical circuit is supported relative to the printed circuit board by means of optical connectors 43 mounted on the ends of the optical fibers such as, for example, the type of optical connector as shown in FIG. 1.

Figure 3:
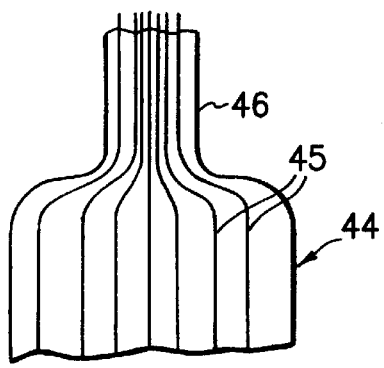
FIG. 3 is a partial plane view of a flexible optical circuit with a tab element adapted to be secured to a connector.
Figure 4:
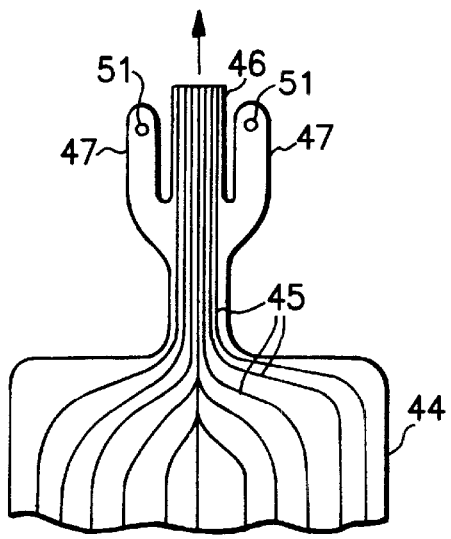
FIG. 4 is a partial plane view of a flexible optical circuit having strain relief arms flanking the tab element in accordance with the features of the present invention.

As shown in FIG. 3 a conventional flexible optical circuit 44 having a plurality of optical fibers 45 embedded therein includes a flexible tab element 46 that is secured to an optical connector at the end portion of flexible element 46. Such a flexible circuit is shown, for example, in U.S. Pat. No. 5,259,051, herein incorporated by reference. If a sudden strain type force were to be felt by flexible circuit 44, i.e. a force that tugs or otherwise exerts a pulling force on the flexible circuit, an optical disconnect can occur in the system with resulting loss in data. In accordance with the specific features and advantages of the present invention and as shown in FIG. 4, there is included along with the flexible optical circuit a strain relief feature that will prevent the negative effects of a sudden strain force on the flexible circuit. As illustrated in FIG. 4 flexible optical circuit 44 having a plurality of optical fibers 45 embedded therein can include tab element 46, the end portion thereof which secures the flexible optical circuit 44 to a connector. The strain relief feature is illustrated in the form of strain relief arms 47 which are positioned in a flanking relationship to tab element 46. Generally speaking, the strain relief feature could be at any location on circuit 44 that is devoid of fibers 45. In accordance with the preferred embodiments of the present invention two strain relief arms positioned in flanking relationship to tab 46 are employed to achieve the desired advantages as described herein. However, it is to be understood that in accordance with the present invention at least one strain relief arm can be used to achieve the desired results. The arms once secured as explained hereinbelow prevents any strain on the flexible circuit from effecting the optical fibers on the tab.

In accordance with the features of the present invention any optical connector that can be optically secured to a flexible optical circuit can be used with the present invention. Examples of optical connectors include the various optical connectors described herein.

Figure 5:
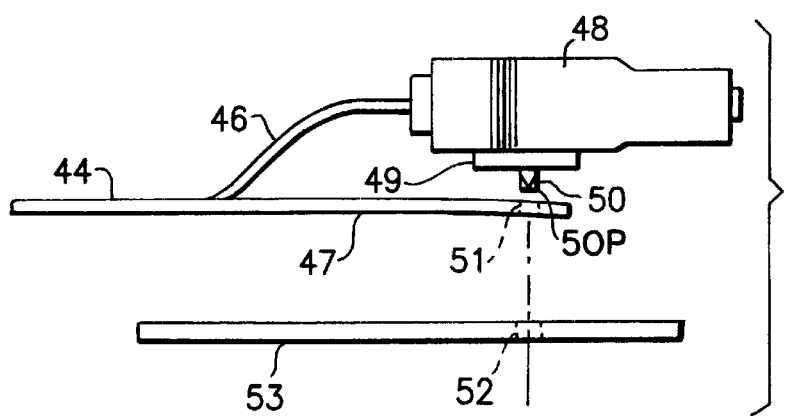
FIG. 5 is a partial plane side view of a flexible optical circuit secured to a connector, the circuit having strain relief arms positioned to be secured to the connector in accordance with the features of the present invention.

FIG. 5 illustrates one example of a preferred mechanism for securing flexible strain relief arms 47 to optical connector 48. Optical connector 48 includes means for securing each strain relief member thereto. In the specific example illustrated in FIG. 5, the connector includes means for securing each strain relief arm thereto. A preferred means for accomplishing this result in accordance with the present invention is mounting element 49 which is positioned on the bottom portion of each optical connector. Each mounting element 49 includes a peg mounting member 50 positioned so as to be projecting away from connector 48. One embodiment of the present invention is to employ preexisting pegs on the connector for securing the strain relief member. However, if the connector does not include any pegs thereon it is within the scope of the present invention that pegs could be added to the connector. In the alternative, for example, the flexible circuit could be mounted to the circuit board by using any suitable and known fastening means that could be used for this purpose. Since one embodiment of this invention has two strain relief arms 47 flanking the tab element 46, each optical connector includes two mounting elements 49, each having a peg mounting member 50 projecting therefrom. To secure the flexible circuit 44 to optical connector 48, peg mounting members 50 can be inserted within each one of the openings 51 located within strain relief arm 47. In order to form a printed circuit board assembly exhibiting the unique features and advantages of the present invention, the combined optical flexible circuit 44 and optical connector 48 can also be secured together to a printed circuit board. This can be achieved by inserting each peg mounting member 50 first in each corresponding opening 51 located in each flexible strain relief arm 47, and then into each corresponding opening 52 located in circuit board 53.

In another embodiment, the peg mounting member 50 can be positioned through pre-existing openings in the flexible strain relief arms 47 and circuit board 53. Alternatively, there can be no pre-existing openings and each peg mount member 50 can include, for example, a nail like end portion 50P so that each peg could be forced through arms 47 or board 53. In both situations, however, the peg mounting members 50 will fit through holes in the arms 47 and/or board 53. When optical connector 48 is pressed inwardly to insert each peg mounting member 50 into the opening into each arm 47, it will capture each flexible strain relief arm 47 under the optical connector. The bottom portion of the connector could include a recessed portion that is shaped to receive the portion of the flexible circuit under the connector for the purpose of maintaining height configurations. Capturing arms 47 in the manner described above will make the flexible optical circuit "pull proof", i.e. if one happens to snag onto the flexible circuit and pull on the circuit you will not disconnect any of the fibers from the circuit thereby avoiding optical disconnect. The arms will transfer the pulling force to the peg mounting members projecting from connector 48.

It is also within the scope of the present invention to employ other means that will secure the flexible strain relief arms to the bottom portion of connector 48 without using peg mounting members 50. It is clearly intended in according with the scope of the present invention to employ any other equivalent mounting mechanism for this purpose.

It should be understood that the foregoing description is only illustrative of the invention. Various alternatives and modifications can be devised by those skilled in the art without departing from the invention. For example, the present invention has been described at various portions herein as an optical flexible circuit. However the present invention could be used on an electrical flexible circuit. Accordingly, the present invention is intended to embrace all such alternatives, modifications and variances which fall within the scope of the appended claims.

What is claimed is:

1. A printed circuit board assembly comprising:
   a printed circuit board;
   an optical fiber connector adapted to be secured to said board; and
   a length of a flexible optical circuit having a number of optical fibers therein, one end portion of said length including a tab element, the end portion of which is secured to said connector and includes at least one strain relief member set apart from the tab element, each member adapted to be secured to said connector.

2. A printed circuit board assembly of claim 1 wherein said strain relief member is flexible.

3. A printed circuit board assembly of claim 2 wherein said strain relief member includes at least one projecting strain relief arm member.

4. A printed circuit board assembly of claim 3 wherein said relief arms are positioned to be in a flanking relationship to said tab element.

5. A printed circuit board assembly of claim 3 wherein said optical circuit includes two of said arms.

6. A printed circuit board assembly of claim 3 wherein said connector includes at least one peg member extending from the bottom portion thereof for securing said connector to said board.

7. A printed circuit assembly of claim 6 wherein said connector includes two of said peg members.

8. A printed circuit board assembly of claim 6 wherein each of said peg members has a pointed end surface.

9. A printed circuit board assembly of claim 6 wherein each of said peg members extends through each of said arm members.

10. A flexible optical circuit comprising:
    at least one optical connector; and
    a length of a flexible material having a number of optical fibers therein, one end portion of said length including a tab element, the end portion of which is secured to said connector and includes at least one strain relief member set apart from the tab element, each member adapted to be secured to said connector.

11. A flexible optical circuit of claim 10 wherein said strain relief member is flexible.

12. A flexible optical circuit of claim 11 wherein said strain relief member includes at least one projecting strain relief arm member.

13. A flexible optical circuit of claim 12 wherein said optical circuit includes two of said arms.

14. A flexible optical circuit of claim 12 wherein said connector includes at least one peg member extending from the bottom portion thereof for securing said connector to said board.

15. A flexible optical circuit of claim 14 wherein said connector includes two of said peg members.

16. A flexible optical circuit of claim 14 wherein each of said peg members has a pointed end surface.

17. A flexible optical circuit of claim 14 wherein each of said peg members extends through each of said arm members.

18. A flexible optical circuit according to claim 12 wherein said relief arm members are positioned to be in a flanking relationship to said tab element.

19. A method of fabricating a flexible optical circuit comprising the steps of:
    providing a plurality of optical fibers extending between first and second end portions of a length of flexible material, said length of flexible material having at one end portion a flexible tab element in combination with at least one flexible strain relief member set apart from the tab element;
    mounting an optical connector to said flexible tab; and
    securing each of said relief members to said connector.

20. A method according to claim 19 further comprising the step of securing said connector to a circuit board.

21. A flexible circuit comprising:
    a flexible substrate having an edge;
    at least one conductive element extending through said flexible substrate and having an end at said edge of said flexible substrate to engage a connector; and
    at least one strain relief element adjacent said end of said conductive element to engage the connector or a substrate on which the connector is mounted;
    wherein said strain relief element is offset from the end of said conductive element when the end of the conductive element is engaged to the connector.

22. The flexible circuit as recited in claim 21, wherein said conductive element is an optically conductive element.

23. The flexible circuit as recited in claim 22, wherein said optically conductive element is an optical fiber.

24. The flexible circuit as recited in claim 21, wherein said at least one strain relief element comprises arms extending from said edge of said flexible substrate and flanking said conductive element.

25. A method of preventing dislocation of a flexible circuit from a connector, said flexible circuit having an area occupied by conductive elements and an area unoccupied by said conductive elements, the method comprising the steps of:

securing said occupied area of said flexible circuit to said connector; and securing said unoccupied area of said flexible circuit to said connector or to a substrate on which said connector mounts;

wherein said unoccupied area of said flexible circuit prevents a strain acting on said flexible circuit from reaching said occupied area and is secured to said connector or said substrate offset from said occupied area.

26. The method as recited in claim 25, wherein the occupied area securing step comprises securing a tab at an edge of said flexible substrate to said connector, and the unoccupied area securing step comprises securing arms, which flank said tab, to said connector or to said substrate on which said connector mounts.

\* \* \* \* \*

UNITED STATES PATENT AND TRADEMARK OFFICE
CERTIFICATE OF CORRECTION

PATENT NO. : 6,425,691 B1
DATED : July 30, 2002
INVENTOR(S) : Drew A. Demangone

It is certified that error appears in the above-identified patent and that said Letters Patent is hereby corrected as shown below:

Column 5,
Line 56, after "element," please add -- and defining a gap therebetween --

Column 6,
Line 18 , after "element," please add -- and defining a gap therebetween --
Line 48, after "element" please add -- and defining a gap therebetween --
Line 61, delete "offset" and replace with -- in an offset plane --

Column 8,
Line 4, delete "offset" and replace with -- is in an offset plane --

Signed and Sealed this

Sixteenth Day of November, 2004

JON W. DUDAS
*Director of the United States Patent and Trademark Office*